(12) United States Patent
Rust

(10) Patent No.: US 12,227,297 B2
(45) Date of Patent: Feb. 18, 2025

(54) AIRCRAFT FLUID ICE PROTECTION SYSTEM

(71) Applicant: THE BOEING COMPANY, Arlington, VA (US)

(72) Inventor: Charles William Rust, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 20 days.

(21) Appl. No.: 18/323,389

(22) Filed: May 24, 2023

(65) Prior Publication Data

US 2024/0017839 A1    Jan. 18, 2024

Related U.S. Application Data

(60) Provisional application No. 63/368,580, filed on Jul. 15, 2022.

(51) Int. Cl.
| | |
|---|---|
| *B64D 15/08* | (2006.01) |
| *B64D 27/30* | (2024.01) |
| *B64D 29/00* | (2006.01) |
| *B64D 33/02* | (2006.01) |

(52) U.S. Cl.
CPC ............. *B64D 15/08* (2013.01); *B64D 29/00* (2013.01); *B64D 27/30* (2024.01); *B64D 2033/0233* (2013.01)

(58) Field of Classification Search
CPC . B64D 5/06; B64D 5/08; B64D 27/30; B64D 2033/0233
See application file for complete search history.

(56) References Cited

U.S. PATENT DOCUMENTS

| | | | | |
|---|---|---|---|---|
| 4,434,201 | A  * | 2/1984 | Humphreys | ........... B64D 15/08 |
| | | | | 428/137 |
| 6,851,624 | B1 * | 2/2005 | Shank | ........................ B60S 1/50 |
| | | | | 239/128 |
| 10,252,808 | B2 | 4/2019 | Jackowski et al. | |
| 11,125,157 | B2 | 9/2021 | Thomas et al. | |
| 2013/0320145 | A1 * | 12/2013 | McGillis | ............... G01F 23/284 |
| | | | | 342/124 |
| 2018/0079512 | A1 * | 3/2018 | Jackowski | .............. G01S 7/497 |
| 2018/0216529 | A1 * | 8/2018 | Maalioune | ............. B64D 15/04 |

(Continued)

OTHER PUBLICATIONS

Extended European Search Report for related EP App. No. 23185521.4 dated Nov. 6, 2023 (7 pages).

*Primary Examiner* — Nicholas McFall

(74) *Attorney, Agent, or Firm* — The Small Patent Law Group LLC; Philip S. Hof

(57) ABSTRACT

A fluid ice protection system for an aircraft includes a plenum back wall and a fluid delivery network. The plenum back wall is affixed to an interior surface of an inlet cowl of a nacelle of the aircraft to define a plenum between the interior surface and a front surface of the plenum back wall. The nacelle surrounds a rotor assembly of an aircraft propulsion system. The inlet cowl defines a plurality of perforations through a thickness of the inlet cowl. The perforations are fluidly connected to the plenum. The fluid delivery network is coupled to the plenum back wall and configured to supply an anti-ice liquid into the plenum for the anti-ice liquid to penetrate through the perforations onto an exterior surface of the inlet cowl along a leading edge section of the inlet cowl.

18 Claims, 9 Drawing Sheets

(56) References Cited

U.S. PATENT DOCUMENTS

| | | |
|---|---|---|
| 2019/0093557 A1* | 3/2019 | Thomas ................. B64D 15/08 |
| 2020/0290742 A1* | 9/2020 | Kumar ................. B64D 35/024 |
| 2021/0129998 A1 | 5/2021 | Goodfellow-Jones et al. |
| 2022/0009644 A1 | 1/2022 | Rabbi et al. |
| 2024/0124716 A1* | 4/2024 | Lin .......................... C09D 7/61 |

\* cited by examiner

AIRCRAFT FLUID ICE PROTECTION SYSTEM

CROSS-REFERENCE TO RELATED APPLICATIONS

This application is a non-provisional conversion of, and claims priority to, U.S. Patent Application No. 63/368,580, filed Jul. 15, 2022, which is hereby incorporated by reference in its entirety.

FIELD OF THE DISCLOSURE

Embodiments of the present disclosure generally relate to systems that prohibit the formation of ice on aircraft exterior surfaces and remove ice from the aircraft exterior surfaces.

BACKGROUND

Ice on exterior surfaces of an aircraft is undesirable because the ice adds weight, can become dislodged in sheets that can damage rotors, lipskins, and other aircraft components, and negatively affects the aerodynamics of the aircraft. To prohibit the formation of ice, some aircraft employ pneumatic anti-ice systems that convey a heated gas stream to warm components that are exposed to the exterior environment, such as wing leading edges and nacelle leading edges. For example, a heated air stream may be fan-driven to blow through a cavity along an interior surface of an engine inlet cowl, heating the inlet cowl from the inside. The heated components prevent ice accumulation along the exterior surfaces thereof.

This pneumatic, thermal anti-ice system has several drawbacks, including high power consumption, relatively high complexity, and an undesirable impact on the aircraft propulsion system due to operational coupling. Regarding power consumption, the power demand to operate the anti-ice system can be substantial. For example, the thermal demand of an air heater and fans may be in the range of 2,000 to 11,000 Btu/hr-ft, which may be equivalent to a range of about 590 to about 3,200 W/ft. Regarding the high complexity, the pneumatic system has to control the heated air stream by integrating bulkheads into the engine inlet panels and wing leading edge panels and providing a network of conduits to convey the heated air. Regarding the complexity and the impact the propulsion system, some known pneumatic systems extract bleed air from a fuel combustion engine for the heated air stream. Utilizing engine bleed air may be complex due to various valves and conduits to control the bleed air. Furthermore, extracting the bleed air from the engine operationally couples the anti-ice system to the engine such that the operation of the anti-ice system may affect engine performance. Some of the engine settings may be directly impacted by the operation of the pneumatic anti-ice system. For example, depending on the engine operational setting, extracting bleed air to power the anti-ice system can stall the engine. In another example, during times that propulsion is not needed, such as a descent and/or slowing of the aircraft, the power demand of the anti-ice system may mandate that the engine continue generating thrust. Operating the engine to produce thrust when propulsion is not needed increases fuel consumption and reduces fuel efficiency.

SUMMARY OF THE DISCLOSURE

A need exists for a fluid ice protection system (FIPS) onboard an aircraft that solves or at least mitigates the issues associated with known pneumatic anti-ice systems that use a heated air stream as the working fluid. A need exists for a FIPS that reduces the power demand (e.g., energy consumption) relative to the known pneumatic anti-ice systems, providing better energy conservation and efficiency. For example, a need exists for a FIPS that has a sufficiently low power demand that the FIPS may be installed on an electric aircraft that is powered by stored electrical energy rather than fuel combustion.

Certain embodiments of the present disclosure provide a fluid ice protection system for an aircraft. The fluid ice protection system includes a plenum back wall and a fluid delivery network. The plenum back wall is affixed to an interior surface of an inlet cowl of a nacelle of the aircraft to define a plenum between the interior surface and a front surface of the plenum back wall. The nacelle surrounds a rotor assembly of an aircraft propulsion system. The inlet cowl defines a plurality of perforations through a thickness of the inlet cowl. The perforations are fluidly connected to the plenum. The fluid delivery network is coupled to the plenum back wall and configured to supply an anti-ice liquid into the plenum for the anti-ice liquid to penetrate through the perforations onto an exterior surface of the inlet cowl along a leading edge section of the inlet cowl.

Certain embodiments of the present disclosure provide a method (e.g., for assembling a fluid ice protection system onboard an aircraft). The method includes affixing a plenum back wall to an interior surface of an inlet cowl of a nacelle of the aircraft to define a plenum between the interior surface and a front surface of the plenum back wall. The nacelle surrounds a rotor assembly of an aircraft propulsion system. The plenum back wall aligns with a plurality of perforations defined through a thickness of the inlet cowl such that the plenum is fluidly connected to the perforations. The method includes coupling a fluid delivery network to the plenum back wall. The fluid delivery network is configured to supply an anti-ice liquid into the plenum for the anti-ice liquid in the plenum to penetrate through the perforations onto an exterior surface of the inlet cowl along a leading edge section of the inlet cowl.

Certain embodiments of the present disclosure provide an aircraft. The aircraft includes an electrical energy storage device, one or more propulsion systems, and a fluid ice protection system. Each of the one or more propulsion systems includes a motor, a rotor assembly, and a nacelle that surrounds the motor and the rotor assembly. The motor is electrically connected to the electrical energy storage device and is powered by the electrical energy storage device to drive the rotor assembly to generate thrust for flight of the aircraft. The fluid ice protection system is incorporated into the nacelle of the one or more propulsion systems. The fluid ice protection system includes a plenum back wall and a fluid delivery network. The plenum back wall is affixed to an interior surface of an inlet cowl of the nacelle to define a plenum between the interior surface and a front surface of the plenum back wall. The inlet cowl defines a plurality of perforations through a thickness of the inlet cowl. The perforations are fluidly connected to the plenum. The fluid delivery network is coupled to the plenum back wall and configured to supply an anti-ice liquid into the plenum for the anti-ice liquid in the plenum to penetrate through the perforations onto an exterior surface of the inlet cowl along a leading edge section of the inlet cowl.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
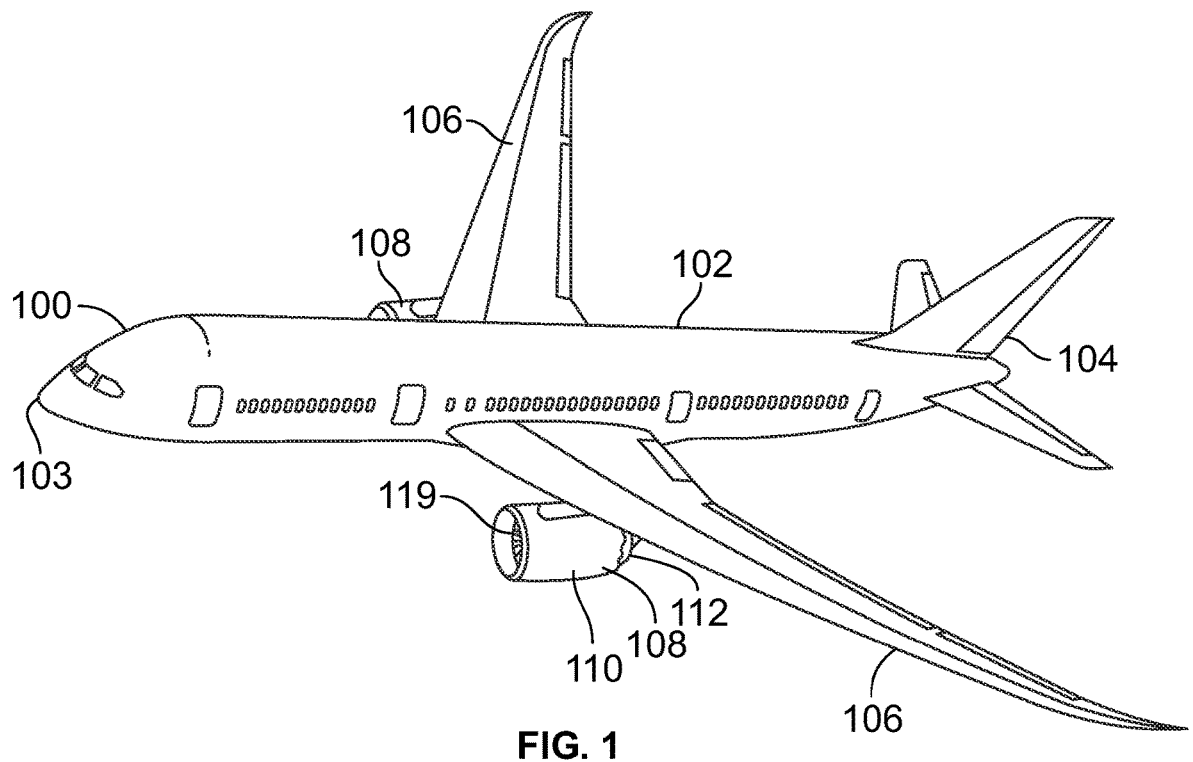
FIG. 1 is a perspective illustration of an aircraft.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a fluid ice protection system (FIPS) for an aircraft. The FIPS may be incorporated into the nacelles of propulsion systems onboard the aircraft, to prohibit the formation of ice along leading edge surfaces of the nacelles. The FIPS may supply an anti-ice liquid to an interior surface of an inlet cowl of the nacelle. The anti-ice liquid may be a freezing point depression compound, such as a glycol-based solution (e.g., propylene glycol). The inlet cowl may include perforations (e.g., holes) that extend through the thickness of the inlet cowl. The perforations may be relatively small and formed via laser drilling. For example, the perforations may be microscopic (e.g., with micron scale diameters). The anti-ice liquid may weep through the perforations onto the exterior surface of the inlet cowl. The liquid prevents the formation of ice (and removes any ice already present) along the inlet cowl, to avoid ice affecting flight and engine performance. The FIPS includes a plenum back wall that is coupled to the interior surface of the inlet cowl to define a plenum (e.g., cavity). The anti-ice liquid is supplied to the plenum through a fluid delivery network of one or more conduits that extend from a reservoir to the plenum back wall at the inlet cowl. The FIPS may include one or more membranes within the plenum that absorb and distribute the anti-ice liquid to the perforations. The FIPS includes a pump that supplies the anti-ice liquid through the fluid delivery network to the plenum. The FIPS may include one or more additional devices, such as a heater device, that is selectively operated to modify a temperature and/or viscosity of the anti-ice liquid. In addition, or as an alternative, to incorporating the FIPS in the inlet cowl of a nacelle, the FIPS optionally may be incorporated into the leading edge portions of wings and/or other components of the aircraft exposed to environmental elements.

The FIPS described herein may provide several inherent benefits over known pneumatic anti-ice systems that use a heated air stream as the working fluid. For example, the FIPS may have a substantially smaller power demand (e.g., energy consumption) during operation than the known pneumatic anti-ice systems, which results in significantly better energy efficiency and conservation. The anti-ice liquid of the FIPS prohibits ice formation by depressing the freezing point at the leading edge surface, such that the moisture on the leading edge surface does not freeze. The anti-ice liquid may not be used to heat the leading edge surfaces, so the anti-ice liquid may operate at a lower temperature than the hot gas stream used in the known pneumatic anti-ice systems, requiring less input energy. As an example of the energy savings, the pump and other active devices of the FIPS may have a combined power demand that is less than 100 W to perform anti-ice on a nacelle, and the pneumatic system may require over 1,000 W to perform the same function on the same nacelle due in large part to the energy used to provide hot air. The energy efficiency of the FIPS described herein is beneficial for reducing costs and increasing the range that an aircraft may travel on a given amount of fuel.

Another benefit associated with the energy efficiency (e.g., conservation) of the FIPS described herein is that the FIPS could be installed on aircraft applications that have limited power availability. The FIPS may have sufficiently low power demand to enable installation on electric-based aircraft powered by stored electrical energy rather than fuel combustion. For example, the pump and other active devise of the FIPS may be powered by an electrical energy storage device (e.g., a battery pack) onboard the aircraft. That electrical energy storage device may be the same energy storage device that supplies electric current to one or more motors for driving rotation of one or more rotor assemblies that generate thrust for propulsion and flight of the aircraft. The known pneumatic anti-ice system may not be practically feasible on an electric aircraft because the pneumatic anti-ice system would consume too much of the stored energy to heat the air, which would significantly shorten the available flight range of the electric aircraft.

When installed on hybrid and/or fuel combustion-powered aircraft, another inherent benefit of the FIPS described herein over the known pneumatic anti-ice system is that the FIPS system is effectively independent of the engine operation. For example, the pump and other active components may be powered by an onboard electrical energy storage device, separate from the fuel combustion engines. There may be no risk of the FIPS system causing an engine to stall or requiring an engine to increase thrust just to maintain the FIPS system in an active operational state. The engine may be operated to control the movement of the aircraft without consideration of the state of the FIPS system, providing reduced control complexity relative to the known pneumatic anti-ice systems.

Additional embodiments described herein provide an inlet assembly that has a short inlet architecture. The inlet assembly may be incorporated into a compact, short nacelle to achieve greater fuel efficiency relative to a longer nacelle. In one or more embodiments, the inlet assembly includes an inlet cowl that has a lipskin. The lipskin includes a composite panel with a metallic coating along an exterior surface of the composite panel. The metallic coating provides an erosion shield to protect against leading edge damage. For example, the metallic coating is exposed along the leading edge to sunlight, wind, moisture, debris, birds, and/or the like, and protects the composite panel from such elements. In an embodiment, the composite panel is or includes carbon fiber. For example, the composite panel may have a carbon fiber reinforced polymer (CFRP) material.

In an embodiment, the lipskin has an outer barrel portion that extends aft for a longer length than at least some conventional inlet cowls. For example, the outer barrel portion of the lipskin may extend aft to an interface with the fan cowl. By extending the lipskin all the way to the fan cowl along the outer side, the inlet cowl described herein may lack a discrete composite outer barrel that is coupled to the lipskin. The composite panel with metallic coating may extend from the leading edge along the outer barrel portion to the interface with the fan cowl. In addition to reducing assembly steps and materials by omitting a separate outer barrel panel, providing a single, unitary structure along the outer length of the inlet may beneficially enlarge the region of laminar air flow along the inlet. For example, the exterior surface of the inlet cowl may be smooth and free of seams from the leading edge along the outer barrel portion to the end of the lipskin, which results in a low likelihood of turbulent air flow along the outer barrel portion. At least some conventional inlet cowls may include seams at interfaces between the lipskin and the outer barrel panel. The seams increase turbulence of the air flow, which is detrimental to flight and engine performance. The inlet cowl described herein may provide an extended natural laminar flow surface, resulting in improved aerodynamic performance. The inlet cowl may include support frames within an interior of the inlet cowl to mechanically support the extended length of the lipskin and withstand forces exerted on the exterior of the lipskin. One or more of the support frames may be open truss-like structures. Optionally, some of the support frames may extend longitudinally, and others of the support frames may extend circumferentially. The support frames may be located aft of the plenum back wall of the FIPS.

Referring now to the drawings, which illustrate various embodiments of the present disclosure, FIG. 1 is a perspective illustration of an aircraft 100. The aircraft 100 may include a fuselage 102 extending from a nose 103 to an empennage 104. The empennage 104 may include one or more tail surfaces for directional control of the aircraft 100. The aircraft 100 includes a pair of wings 106 extending from the fuselage 102. One or more propulsion systems 108 propel the aircraft 100. The propulsion systems 108 are supported by the wings 106 of the aircraft 100, but may be mounted to the fuselage or tail in other types of aircraft. Each propulsion system 108 includes a rotor assembly 119 with rotors that spin to direct air.

The rotor assembly 119 of each propulsion system 108 is surrounded by a nacelle 110. The nacelle 110 is an outer casing or housing that holds the rotor assembly 119. The nacelle 110 includes an inlet section, referred to as an inlet cowl, at a leading or front end of the nacelle 110. The nacelle 110 may also include a fan cowl, a thrust reverser section, and an aft fairing section located behind the inlet cowl along a longitudinal length of the nacelle 110. The inlet cowl has an inner barrel that defines an air inlet duct for directing air to the rotor assembly 119. The inner barrel may have an acoustic panel to facilitate reducing noise created by the rotor assembly 119. The nacelle 110 may have an exhaust nozzle 112 (e.g., a primary exhaust nozzle and a fan nozzle) at an aft end of the propulsion system 108.

In an embodiment, each propulsion system 108 may include or represent a gas turbine engine. The rotor assembly 119 may be a portion of the engine. The engine burns a fuel, such as gasoline or kerosene, to generate thrust for propelling the aircraft 100.

In an alternative embodiment, the rotor assemblies 119 of some of all of the propulsion systems 108 may be driven by electrically-powered motors, rather than by the combustion of fuel within a gas turbine engine. For example, the motors of such propulsion systems 108 may be electrically-powered by an onboard electrical energy storage device (e.g., a battery system) and/or an onboard electrical energy generation system.

Figure 11:
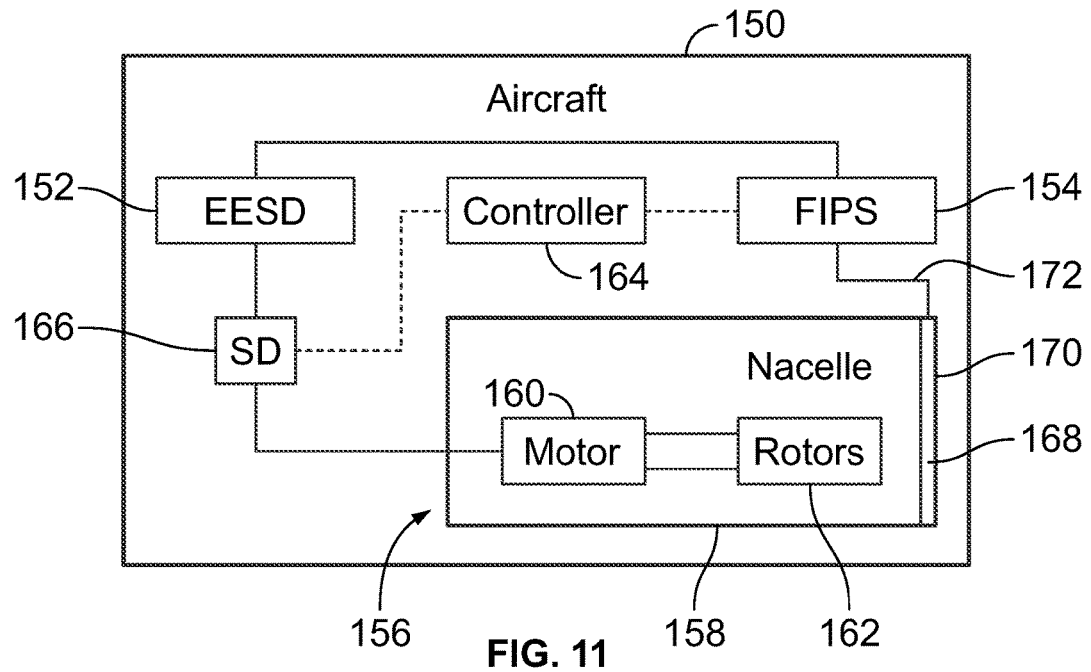
FIG. 11 is a block diagram of a second aircraft according to an embodiment.

FIG. 11 is a block diagram of a second aircraft 150 according to an embodiment. The aircraft 150 in FIG. 11 may be an all-electric aircraft that lacks any fuel combustion engine, or a hybrid aircraft that includes at least one fuel combustion engine. The aircraft 150 includes an electrical energy storage device (EESD) 152, a fluid ice protection system (FIPS) 154, and a propulsion system 156. The propulsion system 156 includes a nacelle 158 that surrounds a motor 160 and a rotor assembly 162 ("rotors" in FIG. 11). The motor 160 is powered by electric current supplied from the EESD 152. The EESD 152 may be a battery system that includes at least one battery cell. Optionally, the EESD 152 may include one or more capacitors or other charge-storing devices. The EESD 152 may be rechargeable.

The aircraft 150 includes a controller 164 that has one or more processors. The controller 164 may control the delivery of electric current to the motor 160 via one or more switch devices (SD) 166 along a power delivery circuit path between the EESD 152 and the motor 160. The motor converts electrical energy to mechanical energy that exerts a torque on the rotor assembly 162 to spin the rotors. The aircraft 150 may be an unmanned aerial vehicle (e.g., a drone), a passenger aircraft, or the like.

The FIPS 154 supplies an anti-ice liquid to an inlet cowl 168 of the nacelle 158 to prohibit the formation of ice along a leading edge 170 of the nacelle 158. The anti-ice liquid is conveyed through one or more conduits 172 that form a fluid delivery network. The FIPS 154 may be powered by electric current supplied from the EESD 152 or another onboard electrical energy storage device. The operation of the FIPS 154 may be controlled by the controller 164, or another controller. All of the components shown in FIG. 11 may be disposed onboard the aircraft 150. The aircraft 150 may include more than one of the illustrated components, such as multiple propulsion systems 156.

Figure 2:
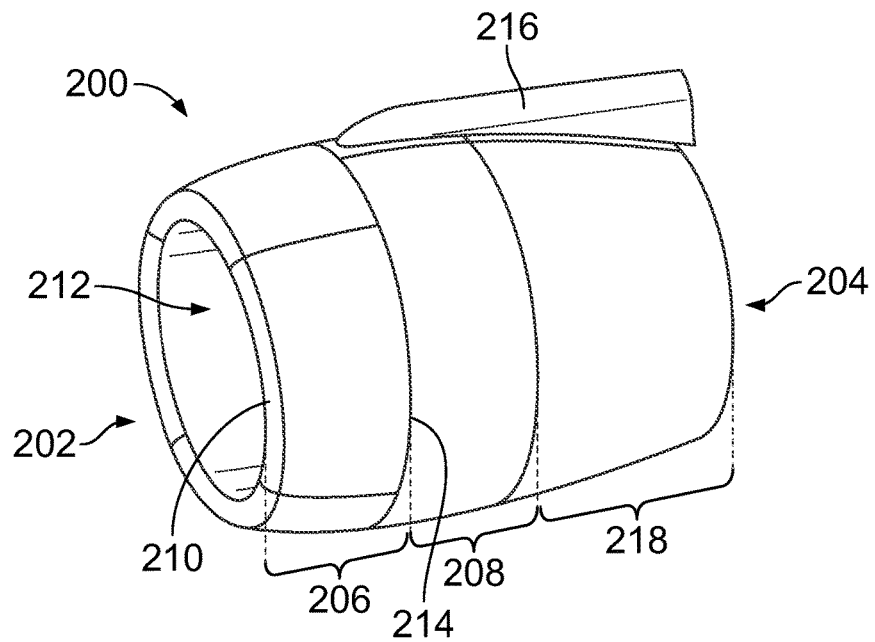
FIG. 2 illustrates an embodiment of a nacelle of a propulsion system of an aircraft according to an embodiment.

FIG. 2 illustrates an embodiment of a nacelle 200 of a propulsion system of an aircraft according to an embodiment. The nacelle 200 may be one of the nacelles 110 of the propulsion systems 108 shown in FIG. 1 and/or the nacelle 158 of the propulsion system 156 shown in FIG. 11. The nacelle 200 extends a length from a front end 202 of the nacelle 200 to an aft end 204 of the nacelle 200 (opposite the front end 202). The nacelle 200 may include an inlet cowl 206 and a fan cowl 208. The inlet cowl 206 defines a leading edge 210 of the nacelle 200 at the front end 202, to direct air into a core 212 of the nacelle 200. The fan cowl 208 is aft of the inlet cowl 206 and is connected to the inlet cowl 206. The fan cowl 208 may connect to and extend from an aft edge 214 of the inlet cowl 206. The fan cowl 208 may surround the rotor assembly, such as one or more fans mounted at a forward end of an engine within the core 212.

The nacelle 200 may include a mount 216 for securing the nacelle 200 and the rotary components held by the nacelle 200 to the aircraft. The mount 216 may be a pylon. The nacelle 200 includes at least one aft section 218 that is disposed aft of the fan cowl 208 along the length of the nacelle 200. When the nacelle 200 holds a gas turbine engine, the aft section(s) 218 may surround engine components such as a compressor, combustion chamber (or combustor), and turbine. The aft section(s) 218 may include or represent a thrust reverser, aft fairing, or the like. The aft section(s) 218 may define the aft end 204 and an aft nozzle through which air and exhaust products are emitted from the propulsion system.

Figure 3:
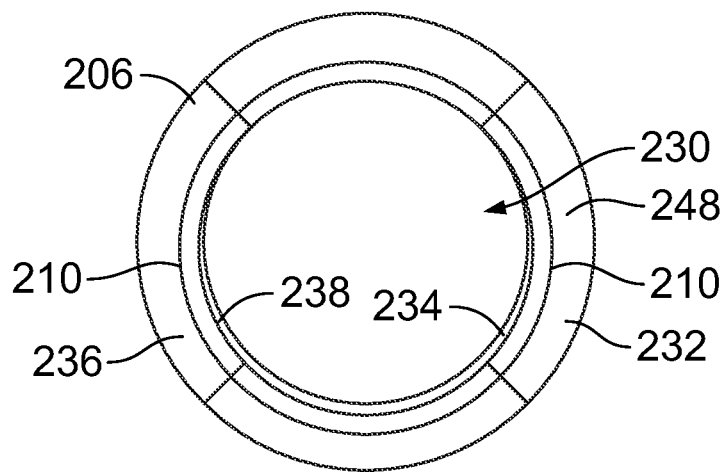
FIG. 3 is a front view of an inlet cowl of the nacelle shown in FIG. 2.
Figure 4:
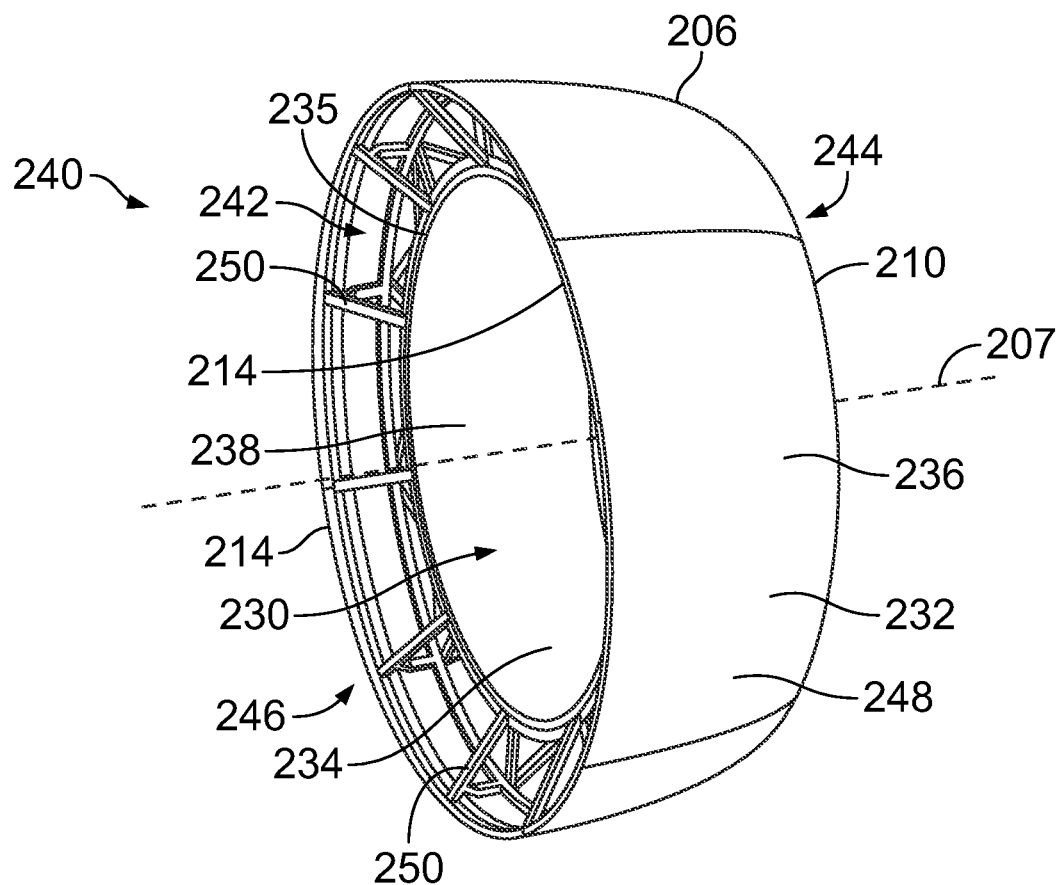
FIG. 4 is a perspective view of the inlet cowl shown in FIGS. 2 and 3, showing an aft edge thereof.

FIG. 3 is a front view of the inlet cowl 206 shown in FIG. 2. FIG. 4 is a perspective view of the inlet cowl 206 shown in FIGS. 2 and 3, showing the aft edge 214 of the inlet cowl 206. The inlet cowl 206 has an annular barrel shape that defines a central opening 230. The term "annular barrel shape" means that the inlet cowl 206 defines a closed, ring-like shape when viewed from the front. The inlet cowl 206 may have a generally cylindrical shape, and is oriented about a central longitudinal axis 207. For example, the leading edge 210 may be circular. The inlet cowl 206 directs air through the central opening 230 into the core 212 of the nacelle 200 shown in FIG. 2. The inlet cowl 206 has an outer barrel portion 232 radially outside of the leading edge 210 and an inner barrel portion 234 radially inside of the leading edge 210. The inner barrel portion 234 may define the central opening 230, and operates as an intake duct to supply air into the core 212 for the rotor assembly. As shown in FIGS. 3 and 4, the outer barrel portion 232 surrounds the inner barrel portion 234. The outer barrel portion 232 is radially offset from the inner barrel portion 234 to define a cavity 242 within the inlet cowl 206. The cavity 242 is closed at a front end 244 of the inlet cowl 206, and open at a rear or aft end 246 of the inlet cowl 206.

The inlet cowl 206 may include a lipskin 236 and an acoustic panel 238. In an embodiment, the lipskin 236 defines the leading edge 210 and the outer barrel portion 232. The acoustic panel 238 is coupled to the lipskin 236 along the inner barrel portion 234, and the acoustic panel 238 defines a length of the inner barrel portion 234. For example, the lipskin 236 may define a front section of the inner barrel portion 234, along the central longitudinal axis 207, and the acoustic panel 238 may define an aft section of the inner barrel portion 234. The aft section extends to an inner aft edge 235 of the inner barrel portion 234 of the inlet cowl 206. The acoustic panel 238 may be located forward of the fan cowl 208. The acoustic panel 238 may be located in relatively close proximity to one or more fans or other rotary equipment. The acoustic panel 238 may have a plurality of acoustic perforations for absorbing noise generated by the rotor assembly and/or the airflow passing through the inlet cowl 206.

As shown in FIG. 4, the inlet cowl 206, including the lipskin 236 and acoustic panel 238, may represent a portion of an inlet assembly 240. The inlet assembly 240 may include at least a portion of an anti-ice FIPS integrated within the cavity 242 of the inlet cowl 206. The FIPS supplies an anti-ice liquid onto an exterior surface 248 of the inlet cowl 206 to prohibit ice formation on the exterior surface 248. The exterior surface 248 that receives the anti-ice liquid is a leading edge section of the inlet cowl 206 that encompasses the leading edge 210. The exterior surface 248 is exposed to the elements, such as sunlight, moisture, debris, wind, birds, etc.

The inlet assembly 240 may include support frames 250 within the cavity 242 of the inlet cowl 206 to mechanically support the lipskin 236 and the acoustic panel 238. The support frames 250 may help withstand pressure and other forces exerted on the exterior surface 248. One or more of the support frames 250 may be open truss-like structures that enable air flow through openings in the support frames 250. In an embodiment, the inlet assembly 240 may lack bulkheads that partition the cavity 242 into multiple channels or regions that are blocked off from each other (e.g., fluidly isolated from each other). Avoiding bulkheads which subdivide the cavity 242 may reduce the complexity of manufacturing the inlet assembly 240 relative to conventional inlets.

Figure 5:
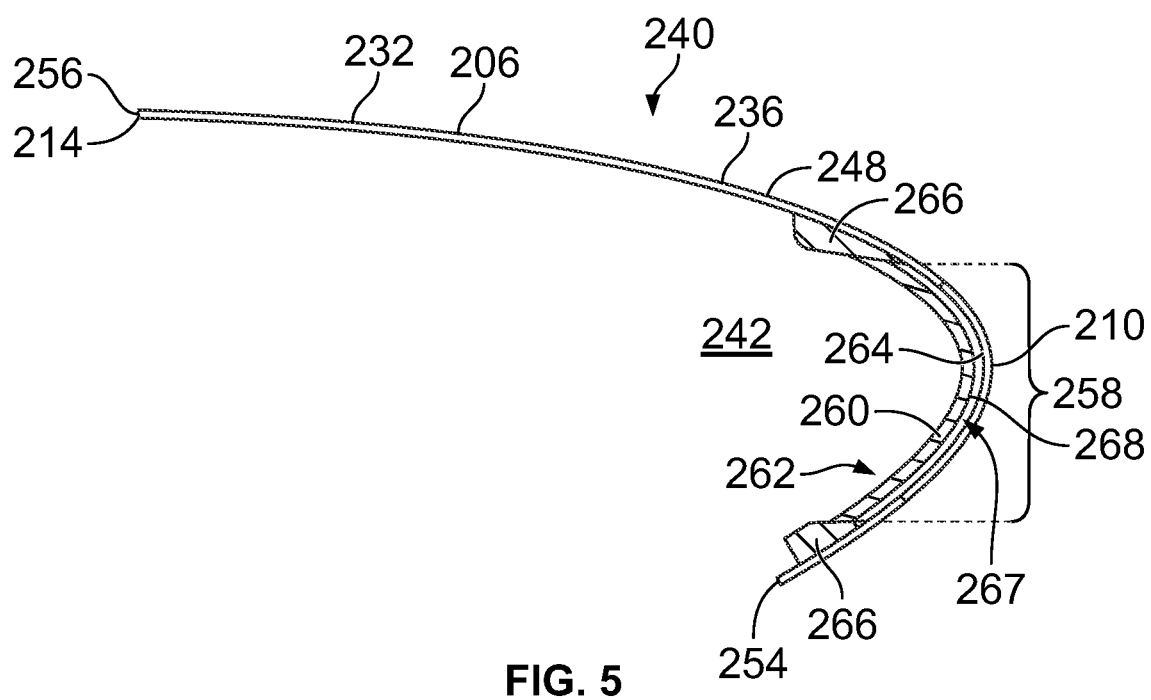
FIG. 5 is a cross-sectional view of a portion of an inlet assembly according to an embodiment.

FIG. 5 is a cross-sectional view of a portion of the inlet assembly 240 according to an embodiment. The illustrated portion shows the lipskin 236 of the inlet cowl 206 without the acoustic panel 238. For example, the acoustic panel 238 may couple to an inner edge 254 of the lipskin 236 during the assembly process. The lipskin 236 in the illustrated embodiment has a curved shape that radially and longitudinally extends forward from the inner edge 254 to the leading edge 210, and then rearward to an outer, aft edge 256 of the lipskin 236. The lipskin 236 may be relatively thin. The area of the inlet cowl 206 (e.g., the lipskin 236 thereof) that includes the leading edge 210 and the areas radially adjacent the leading edge 210 is referred to herein as a front or leading edge section 258 of the lipskin 236. The outer, aft edge 256 may define the aft edge 214 of the inlet cowl 206, such that the lipskin 236 extends the full length of the inlet cowl 206 along the outer barrel portion 232. As shown in FIG. 5, the exterior surface 248 of the inlet cowl 206 is smooth and defined by a single, continuous construct (e.g., the lipskin 236) along the entire length of the outer barrel portion 232. There are no seams, joints, or interfaces from the leading edge 210 to the aft edge 214, which promotes laminar air flow along the aerodynamic exterior surface 248, providing a substantial drag benefit. The inlet assembly 240 described herein may provide a longer and/or larger surface area along which the air flow is laminar, relative to the inlet size, than conventional inlets.

The inlet assembly 240 may include a plenum back wall 260 that is affixed to the inlet cowl 206. The plenum back wall 260 is a component of the FIPS 262. The plenum back wall 260 is disposed within the cavity 242 of the inlet cowl 206 and extends along the leading edge section 258 of the inlet cowl 236. The plenum back wall 260 may be affixed to an interior surface 264 of the inlet cowl 206. In an embodiment, the plenum back wall 260 is bonded to the interior surface 264. In an embodiment, the lipskin 236 of the inlet cowl 206 includes two (e.g., first and second) integrated protrusions 266 along the interior surface 264 that serve as mounts on which to affix the plenum back wall 260. The protrusions 266 project from the interior surface 264 into the cavity 242. The protrusions 266 may be integral to the lipskin 236. In an alternative embodiment, the protrusions 266 may be discrete components that are themselves mounted to the interior surface 264 and serve to indirectly secure the plenum back wall 260 to the lipskin 236. The plenum back wall 260 is mounted to the inlet cowl 206 to define a plenum 267 (e.g., fluid manifold) for receiving and containing the anti-ice liquid of the FIPS 262. The plenum 267 is longitudinally defined between the interior surface 264 of the lipskin 236 and a front surface 268 of the back wall 260. The plenum 267 is radially defined between the two protrusions 266. The plenum 267 may be located along the leading edge section 258 of the lipskin 236 only. For example, the plenum 267 may not extend along the outer barrel portion 232.

Figure 6:
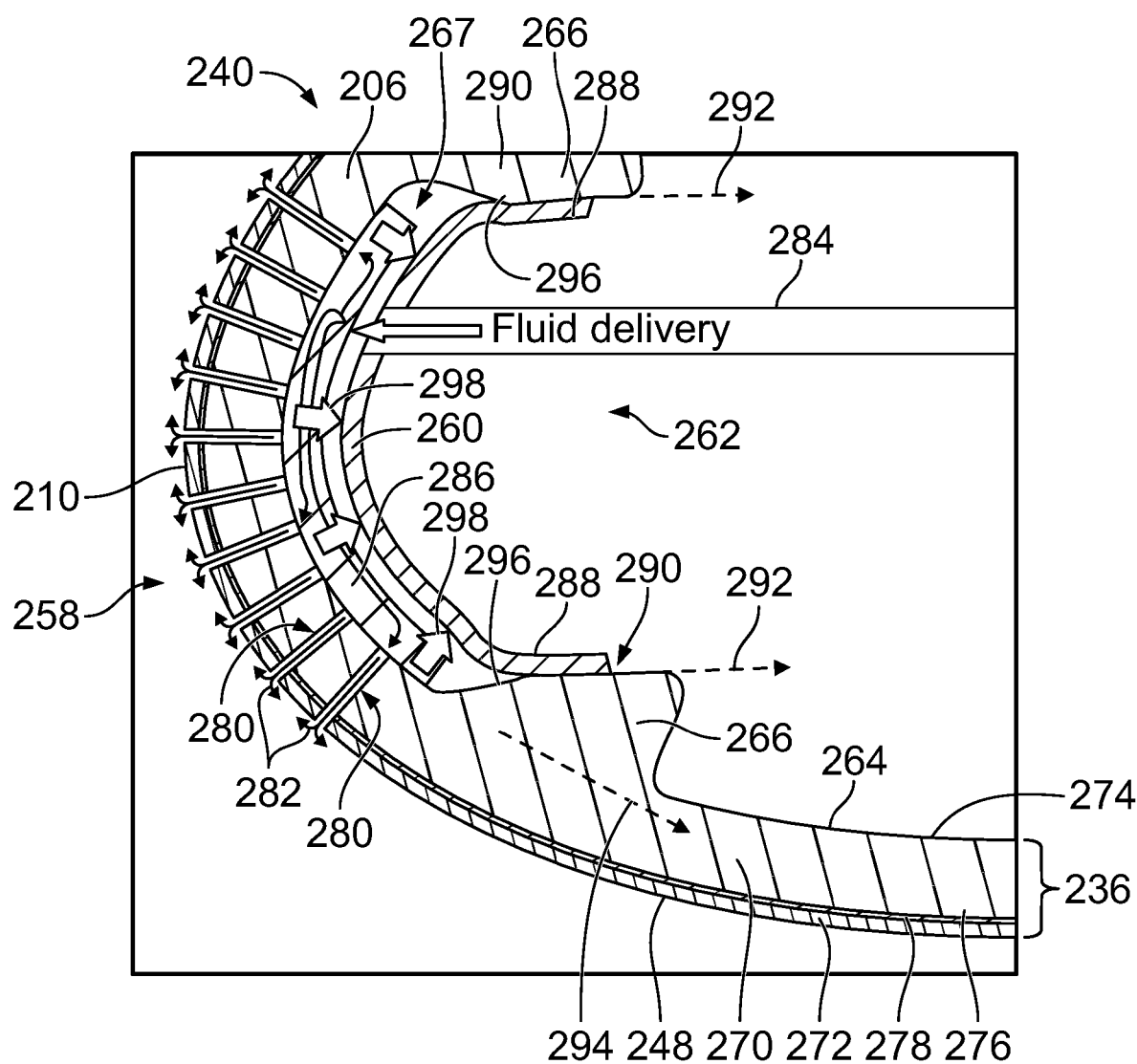
FIG. 6 illustrates an enlarged, schematic rendering of the inlet assembly at a leading edge according to an embodiment.

FIG. 6 illustrates an enlarged, schematic rendering of the inlet assembly 240 at the leading edge 210 according to an embodiment. The illustrated components in FIG. 6 are depicted for ease of description, and may not be drawn to scale. The lipskin 236 of the inlet cowl 206 in an embodiment is a stack-up of multiple different layers. The lipskin 236 may include at least a composite panel 270 and a metallic coating 272. The metallic coating 272 is exterior of the composite panel 270 to provide an erosion shield that protects the composite panel 270 from leading edge damage. The metallic coating 272 may define the exterior surface 248 of the inlet cowl 206 along at least the leading edge section 258, and optionally all of the surface area of the inlet cowl 206 that is exposed to the environmental elements. The composite panel 270 and metallic coating 272 may continuously extend the full length of the lipskin 236.

The composite panel 270 has an interior surface 274 and an exterior surface 276 opposite the interior surface 274. The interior surface 274 may define the interior surface 264 of the inlet cowl 206. The metallic coating 272 is disposed along the exterior surface 276 of the composite panel 270. In an embodiment, the metallic coating 272 is indirectly connected to the exterior surface 276 via one or more intervening layers. The one or more intervening layers may include an electrically conductive layer 278 that is provided to assist with the application of the metallic coating 272 on the composite panel 270. The conductive layer 278 may be a metallic material that has a different composition than the metallic coating 272. For example, the conductive layer 278 may be a thin silver (Ag) loaded sheet.

In an embodiment, the composite panel 270 is or includes carbon fiber. For example, the composite panel 270 may have a carbon fiber reinforced polymer (CFRP) material. The polymer may be a plastic (e.g., thermoplastic) or the like. The metallic coating 272 may be a metal alloy. For example, the metallic coating 272 in an embodiment is a nickel-cobalt (NiCo) alloy. The metallic coating 272 may be deposited onto the lipskin 236 to solidify and harden. In an embodiment, the metallic coating 272 is applied via electroplating. For example, the metallic coating 272 may be a NiCo alloy that is electroplated directly onto the conductive layer 278 of the lip skin 236.

The lipskin 236 of the inlet cowl 206 may define multiple perforations 280 that penetrate the thickness of the lipskin 236 along the leading edge section 258. The perforations 280 may extend continuously through the composite panel 270, the conductive layer 278, and the metallic coating 272. The perforations 280 are aligned with and open to the plenum 267, such that the perforations 280 are fluidly connected to the plenum 267 and receive anti-ice liquid 282 from the plenum 267. The characteristics of the perforations 280, such as diameter, location, percent-open-area, etc., may be selected based on application-specific parameters. In an embodiment, the perforations 280 have micron scale diameters. For example, a diameter of each perforation may be less than 100 microns, and optionally less than 50 microns. The microscopic perforations 280 may be formed via laser drilling. The tiny perforations 280 enable the liquid 282 under pressure to slowly weep through the perforations 280 onto the exterior surface 248. The anti-ice liquid 282 may be a solution that provides freezing point depression. For example, the anti-ice liquid 282 may be a propylene glycol-based solution, an ethylene glycol-based solution, or the like.

The components of the FIPS 262 that are illustrated in FIG. 6 include the plenum back wall 260, a fluid delivery conduit 284 that is coupled to the plenum back wall 260, and one or more membranes 286. The conduit 284 may be a duct, tube, or the like that is a component of a fluid delivery network 500 (shown in FIG. 12) of the FIPS 262. The fluid delivery network 500 provides a path from a fluid reservoir 502 (shown in FIG. 12) to the plenum 267. The anti-ice liquid 282 may be pumped through the conduit 284 into the plenum 267 through an aperture in the back wall 260. The one or more membranes 286 are disposed within the plenum 267 (e.g., between the lipskin 236 and the back wall 260) and receive the anti-ice liquid 282. A single membrane 286 is shown in FIG. 6. The membrane 286 may be designed to absorb and distribute the anti-ice liquid 282 to the perforations 280. The membrane 286 may be secured to the interior surface 264 of the inlet cowl 206, such as by bonding. The membrane 286 aligns with the perforations such that the membrane 286 may extend across and cover all or a majority of the perforations 280. The membrane 286 may spread the anti-ice liquid 282 along a length of the membrane 286 which supports a more uniform distribution of the liquid 282 among the perforations 280. The membrane 286 optionally may be a porous material, such as a porous plastic material, an open-celled foam material, or the like.

In an embodiment, the plenum back wall 260 includes first and second flanges 288 at respective ends of the back wall 260. The flanges 288 are secured to the protrusions 266 of the lipskin 236 along respective contact interfaces 290. The flanges 288 may be bonded, via respective first and second lap joints, to the protrusions 266 at the contact interfaces 290. The bonding may be accomplished via application of an adhesive, a heat treatment, and/or the like. In an embodiment, the contact interfaces 290 are angled transverse to the tangent of the interior surface 264 of the lipskin 236 proximate to the contact interfaces 290 to enhance retention of the plenum back wall 260 to the lipskin 236. The contact interfaces 290 (e.g., the first and second lap joints) extend along ramp surfaces 296 of the protrusions 266. The contact interfaces 290 have vectors 292 that are not parallel to the tangent 294 of the interior surface 262. The contact interfaces 290 are angled to shift the pressure loading dynamics along the bonded interfaces 290 and enable the plenum back wall 260 to withstand more force before separating from the lipskin 236, relative to bonding the back wall 260 to a flat or non-projecting area of the interior surface 264 of the lipskin 236.

For example, the plenum 267 may experience pressure that tends to force the plenum back wall 260 away from the leading edge 210, as indicated by the force arrows 298. Furthermore, the composite panel 270 and the protrusions 266 are not metallic, so the plenum back wall 260 cannot be welded to the lipskin 236. In an embodiment, the protrusions 266 may be composed of a rigid, closed-cell foam. By bonding the flanges 288 to the protrusions 266 along the angled contact interfaces 290 of the first and second lap joints, the forces exerted on the back wall 260 are withstood by shear retention along the contact interfaces 290. For example, the forces on the back wall 260 may be acutely angled relative to the interface vectors 292, which is resisted in part by shear loading at the interfaces 290. Without the angled contact interfaces 290, the forces on the back wall 260 may peel the back wall 260 off the interior surface 264 of the lipskin 236, obstructing, if not entirely foiling, operation of the FIPS 262.

Figure 7:
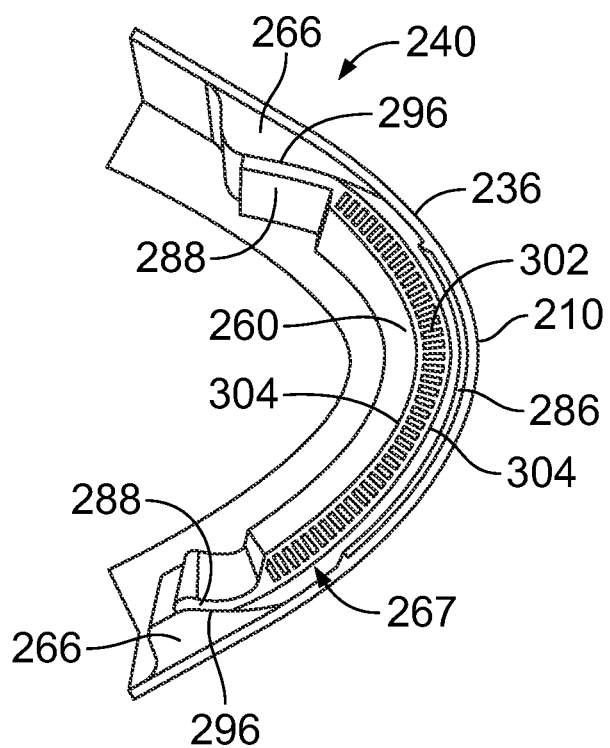
FIG. 7 is a cross-sectional view of a nose portion of the inlet assembly according to an embodiment.
Figure 8:
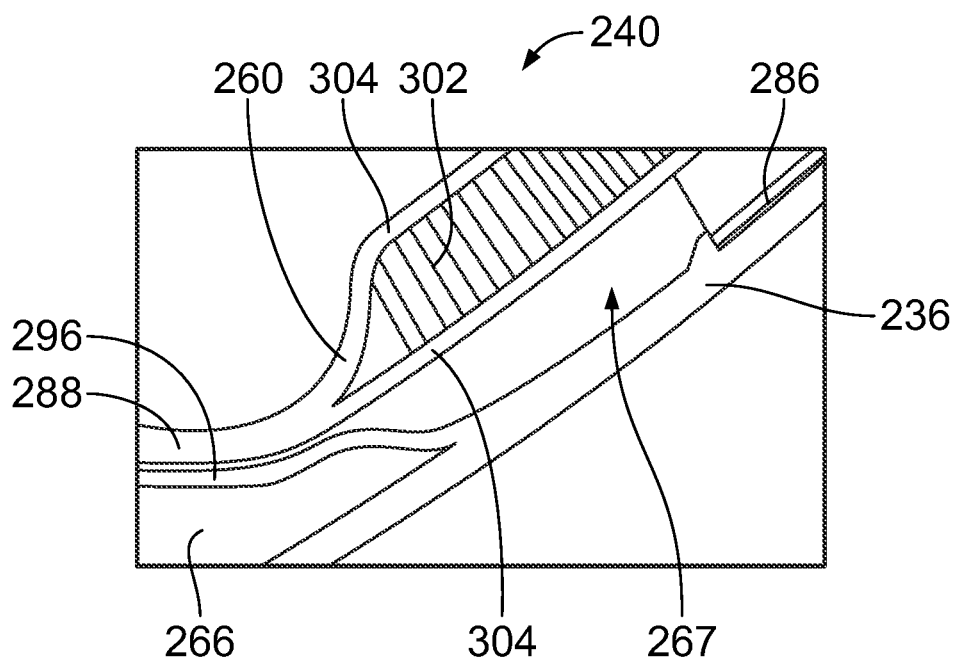
FIG. 8 is an enlarged view of a segment of the nose portion shown in FIG. 7.

FIG. 7 is a cross-sectional view of a nose portion of the inlet assembly 240 according to an embodiment. FIG. 8 is an enlarged view of a segment of the nose portion shown in FIG. 7. The views in FIGS. 7 and 8 may be more accurate in terms of scale and shapes of the components relative to the illustration in FIG. 6. FIG. 7 shows the leading edge 210 of the lipskin 236, the plenum back wall 260, the protrusions 266, and the membrane 286. With reference to both FIGS. 7 and 8, the thin membrane 286 is disposed within the plenum 267. The flanges 288 of the back wall 260 are secured to the ramp surfaces 296 of the protrusions 266, as described with reference to FIG. 6. In an embodiment, the plenum back wall 260 may be a composite structure. For example, the back wall 260 may include a core layer 302 sandwiched between two outer layers 304. The core layer 302 may be a honeycomb structure. In an embodiment, the protrusions 266 may include a rigid, closed-cell foam material. The protrusions 266 may be integrated onto the lipskin 236, such as formed as portions of the CFRP composite panel 270.

Figure 9:
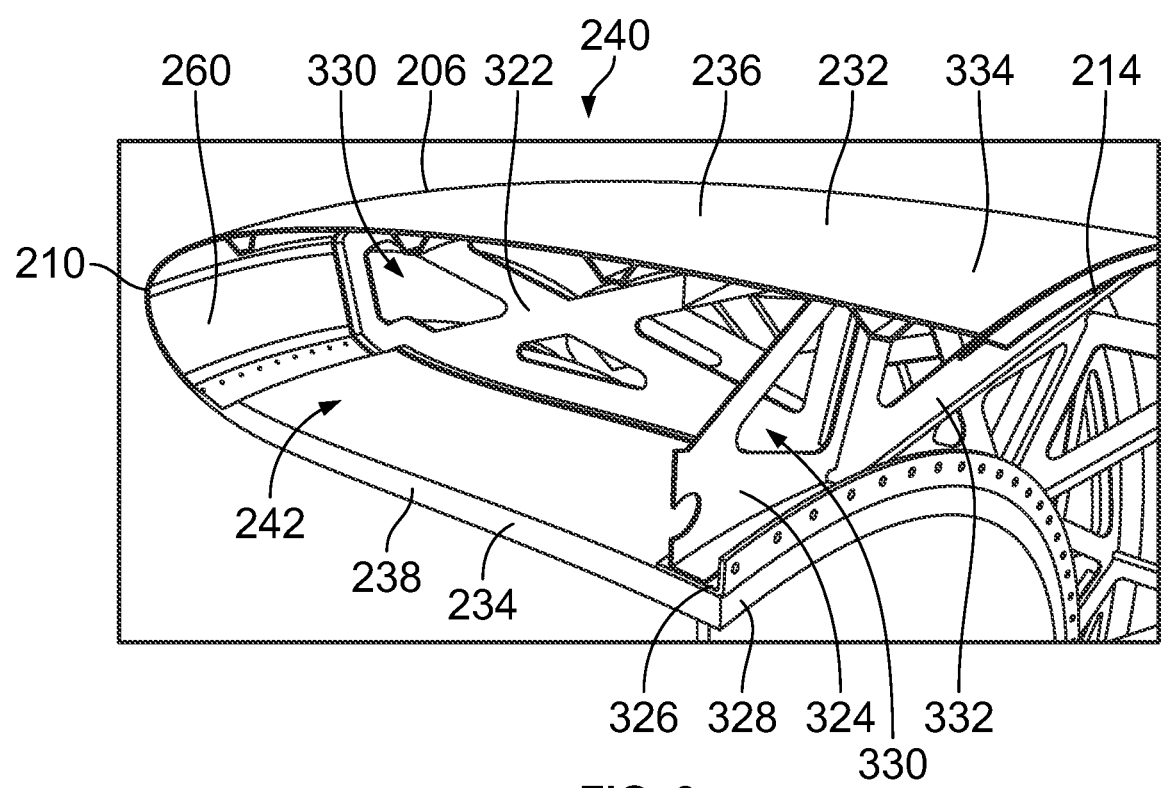
FIG. 9 is a cross-sectional view of a portion of the inlet assembly according to an embodiment.

FIG. 9 is a cross-sectional view of a portion of the inlet assembly 240 according to an embodiment. FIG. 9 shows the acoustic panel 238 longitudinally extending along the inner barrel portion 234, and the lipskin 236 longitudinally extending the length of the outer barrel portion 232. The plenum back wall 260 is disposed at the front end of the cavity 242, interior of the leading edge 210. The inlet assembly 240 may include support frames within the cavity 242 to mechanically support the extended length of the lipskin 236 and withstand forces exerted on the lipskin 236 to maintain the shape of the inlet cowl 206.

In an embodiment, the support frames include longitudinally extending support frames 322 that are circumferentially spaced apart. The support frames may also include circumferentially extending support frames 324. The circumferentially extending support frames 324 may be located proximate to the aft edge 214 of the inlet cowl 206. For example, the support frames 324 may be coupled to a flange 326 mounted to an aft edge 328 of the acoustic panel 238. The support frames 324 may be perpendicular to the support frames 322. The support frames 322, 324 may all extend from the outer barrel portion 232 to the inner barrel portion 234. In an embodiment, the support frames 322, 324 are open, truss-like structures that permit fluid flow through openings 330 in the frames 322, 324. The support frames 322, 324 may be rearward or aft of the plenum back wall 260.

Optionally, the outer barrel portion 232 may extend aft beyond the aft edge 328 of the acoustic panel 238. The inlet assembly 240 may include one or more triangular support frames 332 to support the overhanging, cantilevered portion 334 of the outer barrel portion 232.

Figure 10:
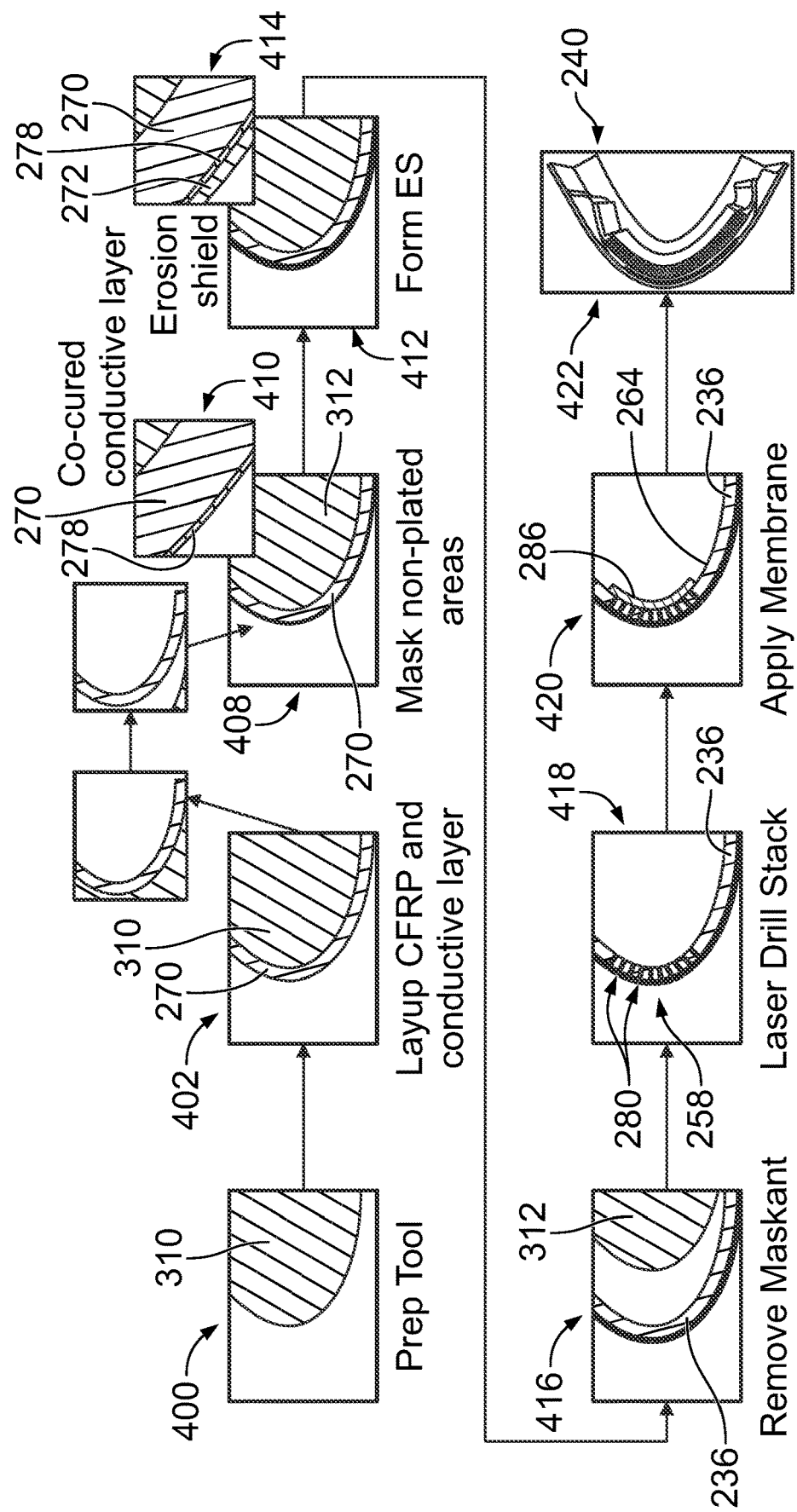
FIG. 10 is a schematic diagram depicting a process of assembling an inlet assembly according to an embodiment.

FIG. 10 is a schematic diagram depicting a process of assembling an inlet assembly according to an embodiment. The inlet assembly manufactured by the process may be the inlet assembly 240 shown in FIGS. 4 through 9. At box 400, a curved tool 310 is prepped for a layup process. The curved tool 310 may be a mold or mandrel. The tool 310 may have a shape that corresponds to a desired shape of the inlet cowl. At box 402, a carbon fiber reinforced polymer (CFRP) material is applied on the curved tool 310 to form the composite panel 270 via a layup process. The layup process may be an automated fiber placement (AFP) process in which multiple layers of fiber-reinforced material are applied on the tool 310. The layers may be tows or bundles of carbon fibers impregnated with an epoxy resin. The tows may be applied in different orientations relative to one another. Although not shown, the protrusions 266 of the lipskin 236 may be formed during the layup step shown in box 402.

The composite panel 270 may then be cured via a heat treatment and removed from the tool 310. Optionally, the conductive layer 278 may be applied to the exterior surface 276 of the composite panel 270. At box 408, non-plated areas of the composite panel 270 are masked by a maskant 312. The conductive layer 278, if present, may be co-cured at box 410.

At box 412, the metallic coating 272 is applied on the composite panel 270 (and conductive layer 278) by electroplating. The metallic coating 272 is shown in the inset enlarged view in box 414. At box 416, the maskant is removed from the structure, yielding the lipskin 236 (or stack). At box 418, the lipskin 236 is laser drilled to form perforations 280 through the thickness thereof in the leading edge section 258. At box 420, the membrane 286 is applied along the interior surface 264 of the inlet cowl 206 (e.g., the lipskin 236) to cover the perforations 280.

Box 422 shows a portion of the completed inlet assembly 240, similar to the view in FIG. 7. The assembly process may include additional steps not depicted in FIG. 10, such as bonding the plenum back wall 260 to the composite panel 270 and connecting the fluid delivery conduit 284 to the plenum back wall 260. Additional portions of the FIPS 262 may need to be assembled before the FIPS 262 is operational.

Figure 12:
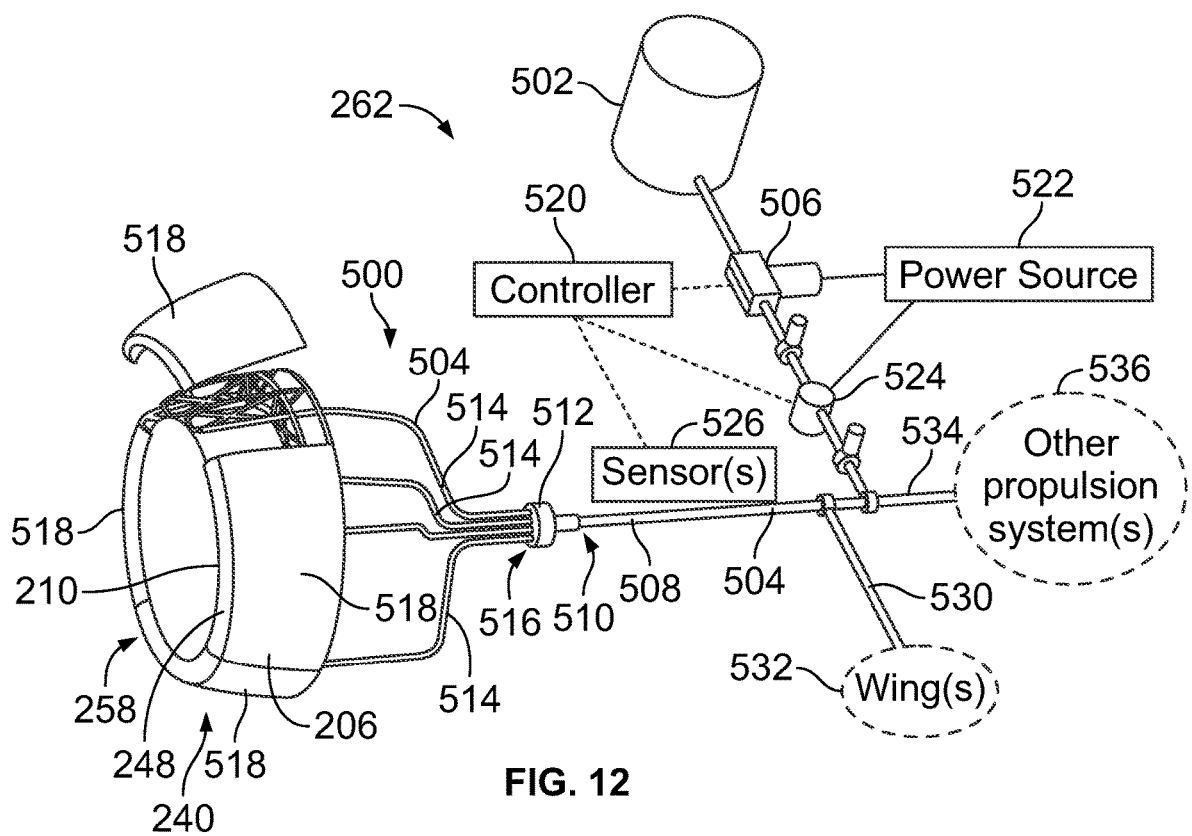
FIG. 12 illustrates a fluid ice protection system integrated onto an aircraft according to an embodiment.

FIG. 12 illustrates the FIPS 262 integrated onto an aircraft according to an embodiment. When the aircraft on which the FIPS 262 is installed is an electric only or hybrid electric aircraft, the FIPS 262 may be the FIPS 154 shown in FIG. 11. The FIPS 262 includes the fluid reservoir or tank 502 that contains the anti-ice liquid. The FIPS 262 also includes the fluid delivery network 500 of one or more conduits 504 that convey the anti-ice liquid from the reservoir 502 to the plenums 267 (shown in FIG. 6). The conduit 284 that is coupled to the plenum back wall 260 (shown in FIG. 6) is one of the conduits 504 of the fluid delivery network 500. The FIPS 262 also includes a pump 506 that is operably connected to the fluid delivery network 500 and the reservoir 502. The pump 506 is controlled to supply the anti-ice liquid from the reservoir 502 along the fluid delivery network 500 to the plenum 267. The anti-ice liquid is pumped to the plenums 267 for the anti-ice liquid to penetrate through the perforations 280 (shown in FIG. 6) onto the exterior surface 248 of the inlet cowl 206 along the leading edge section 258.

The fluid delivery network 500 of conduits 504 spans the distance from the reservoir 502 to the leading edge 210 of the inlet cowl 206. The network 500 allows the reservoir 502 and pump 506 to be located at an area of the aircraft that has adequate available space. For example, the reservoir 502 and the pump 506 may be remote from the nacelle within a compartment of the fuselage. Because the FIPS 262 is hydraulic, there may be negligible line loss from pumping the anti-ice liquid a longer distance.

In an embodiment, the fluid delivery network 500 includes a feeder conduit 508 coupled to an inlet 510 of a proportioning device 512 and multiple branch conduits 514 coupled to an outlet 516 of the proportioning device 512. The proportioning device 512 may distribute the anti-ice liquid received from the feeder conduit 508 to the multiple branch conduits 514. The branch conduits 514 may deliver the liquid to different sections of the same inlet cowl 206 and/or to different components, such as to different nacelles. For example, the branch conduits 514 couple to the plenum back wall 260 (shown in FIG. 6) along different respective sections 518 of the inlet cowl 206. In the illustrated embodiment, the inlet cowl 206 is partitioned into four quadrant sections 518, and each of the four branch conduits 514 is connected to a different corresponding one of the quadrant sections 518. Optionally, the proportioning device 512 may be a valve system that enables selective unequal allocation of the liquid among the branch conduits 514, as controlled by a controller 520.

The pump 506 may be an airframe/propeller pump. A power source 522 is operably connected to the pump 506 and supplies electric current to power operation of the pump 506. The power source 522 may be an electrical energy storage device disposed onboard the aircraft. For example, the power source 522 may be the EESD 152 of the aircraft 150 in FIG. 11. The power source may power additional active components of the FIPS 262, such as a heater device 524. The heater device 524 may include a resistive heating element that generates heat when electrical power is supplied to the heating element. The anti-ice fluid may absorb some of the heat to increase the temperature of the anti-ice liquid. In an embodiment, the heater device 524 is used sparingly and only to maintain a sufficiently low viscosity of the liquid to maintain flowability through the conduit network 500.

The FIPS 262 may include a controller 520 that has one or more processors and operates based on programmed instructions (e.g., software and/or firmware). The controller 520 is operably connected, via wired or wireless communication pathways, to the pump 506 and the heater device 524. The controller 520 may be connected to one or more sensors 526. The one or more sensors 526 may measure one or more properties of the anti-ice liquid in the FIPS 262, ambient properties in the surrounding environment, and/or the like. The controller 520 may control operation of the FIPS 262 based on the sensor measurements generated by the sensor(s) 526.

In an embodiment, the sensor(s) 526 may generate sensor data indicative of a pressure within the FIPS 262, such as within the fluid delivery network 500. The pressure sensor(s) 526 are means for detecting low pressure and high pressure warnings. For example, the controller 520 may receive sensor data indicating the pressure within the FIPS 262 and may compare the sensor data to designated values or ranges that represent acceptable pressure levels. In response to the sensor data indicating the pressure within the FIPS 262 is outside of a designated pressure range and/or exceeds a designated threshold pressure value, the controller 520 may generate a control signal to take remedial action. The remedial action may involve the controller 520 generating a control signal to change an operating setting of the pump 506 if the pressure is outside of the pressure range and/or beyond the threshold pressure value. In another example, if the pressure is too high, the controller 520 may open a relief valve to reduce the pressure in the FIPS 262. If the pressure is too low, the controller 520 may increase the control setting of the pump 506. Although pressure is described, a similar feedback control technique may be applied by the controller 520 to monitor and control other types of properties of the FIPS 262 during operation.

In an embodiment, one or more of the sensors 526 may generate sensor data indicative of a temperature of the anti-ice liquid within the FIPS 262. The controller 520 receives the sensor data and compares the temperature of the anti-ice liquid to a designated temperature range and/or threshold temperature value. If the measured temperature is outside of the designated range and/or beyond the threshold value, then the controller 520 may generate a control signal to take a remedial action. In an example, in response to the temperature of the anti-ice liquid being below the threshold temperature value, the controller 520 may activate the heater device 524 (from an inactive state) and/or increase the power setting of the heater device 524 that is already in an active state. Activating and/or increasing power to the heater device 524 may warm the anti-ice liquid, which reduces the viscosity of the liquid. In an embodiment, the heater device 524 may only warm the anti-ice liquid to maintain the liquid phase and ensure that the viscosity of the liquid is sufficiently low to maintain flowability through the network 500. The controller 520 optionally does not attempt to heat the anti-ice liquid above the freezing point of water.

The fluid delivery network 500 of the FIPS 262 optionally may branch off to other areas of the aircraft for providing the anti-ice liquid to other components that have leading edges exposed to the elements. For example, a second feeder pipe 530 may extend to one or both wings 532 of the aircraft. A third feeder pipe 534 may extend to at least one other propulsion system 536 onboard the aircraft, such as a second nacelle. Specifically, the plenum back wall 260 (FIG. 6) affixed to the interior surface of the inlet cowl 206 of the nacelle shown in FIG. 12 may be a first plenum back wall, and the FIPS 262 may include a second plenum back wall affixed to an interior surface of a leading edge section of a first wing 532 of the aircraft. The FIPS 262 may include a third plenum back wall affixed to an interior surface of a leading edge section of a second wing 532 of the aircraft. The FIPS 262 may also include a fourth plenum back wall affixed to an interior surface of a leading edge section of an inlet cowl of a second nacelle of the aircraft. The fluid delivery network 500 includes a first set of one or more conduits 508, 514 that convey the anti-ice liquid to the first plenum back wall of the inlet cowl 206, a second set of one or more conduits that convey the anti-ice liquid to the second plenum back wall, a third set of conduits to supply the anti-ice liquid to the third plenum back wall, and a fourth set to supply the anti-ice liquid to the fourth plenum back wall.

The FIPS 262 described herein may be relatively energy efficient and energy conservative. For example, the entire FIPS 262 may draw less than 100 watts of power during operation. This low power demand enables the FIPS 262 to be installed on electrically-powered aircraft.

Figure 13:
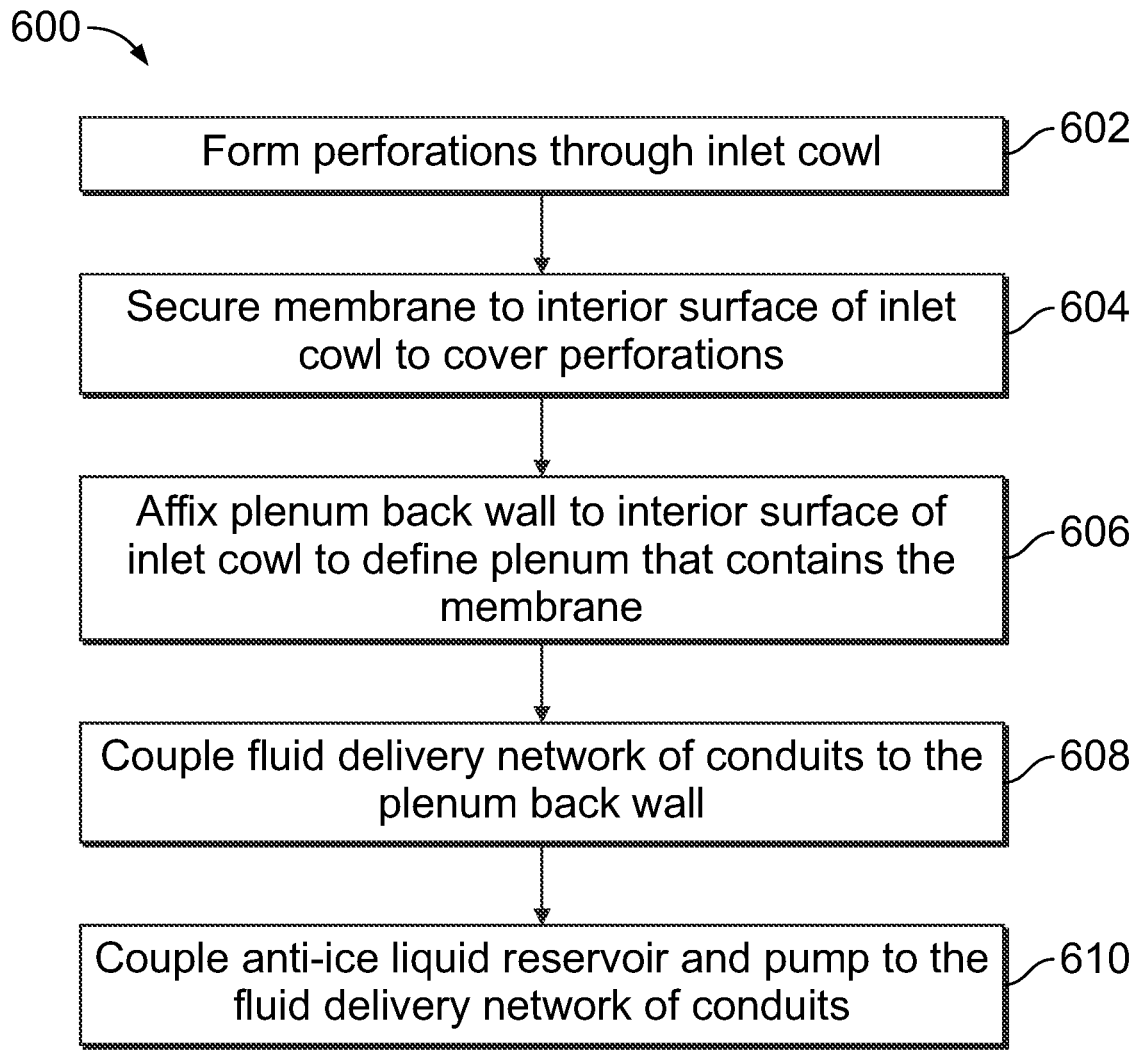
FIG. 13 is a flow chart of a method for assembling a fluid ice protection system onboard an aircraft according to an embodiment.

FIG. 13 is a flow chart 600 of a method for assembling a fluid ice protection system onboard an aircraft according to an embodiment. The method may include additional steps, fewer steps, and/or different steps than the steps illustrated in the flow chart 600. At step 602, a plurality of perforations 280 are formed through a thickness of an inlet cowl 206 of a nacelle 200 of the aircraft. The nacelle 200 surrounds a rotor assembly 119 of an aircraft propulsion system 108. The perforations 280 may be formed by laser drilling the perforations 280 through a CFRP panel 270 and a metallic coating 272 of a lipskin 236 of the inlet cowl 206. The metallic coating 272 is disposed along an exterior surface 276 of the panel 270 to protect the CFRP material from damage. The metallic coating 272 may define an exterior surface 248 of the inlet cowl 206.

At step 604, a membrane 286 is secured to the interior surface 264 of the inlet cowl 206 such that the membrane 286 covers the perforations 280. The membrane 286 may be a porous plastic designed to distribute the anti-ice liquid among the perforations 280.

At step 606, a plenum back wall 260 is affixed to the interior surface 264 of the inlet cowl 206 to define a plenum 267 between the interior surface 264 and a front surface 268 of the plenum back wall 260. The plenum back wall 260 aligns with the perforations 280 defined through a thickness of the inlet cowl 206 such that the plenum 267 is fluidly connected to the perforations 280. The membrane 286 is encapsulated within the plenum 267. Optionally, the plenum back wall 260 is affixed to the inlet cowl 206 by bonding first and second flanges 288 of the plenum back wall 260 to respective ramp surfaces 296 of first and second protrusions 266 that project from the interior surface 264. The plenum 267 is defined between the first and second protrusions 266.

At step 608, a fluid delivery network 500 of one or more conduits 504 is coupled to the plenum back wall 260. The fluid delivery network 500 supplies an anti-ice liquid into the plenum 267 for the anti-ice liquid in the plenum 267 to penetrate through the perforations 280 onto an exterior surface 248 of the inlet cowl 206 along a leading edge section 258 of the inlet cowl 206. At step 610, a reservoir 502 and a pump 506 of the FIPS 262 are coupled to the conduits 504 of the network 500. The pump 506 may be controlled to supply the anti-ice liquid from the reservoir 502 along the network 500 to the plenum 567.

Further, the disclosure comprises examples according to the following clauses:

Clause 1. A fluid ice protection system for an aircraft, the fluid ice protection system comprising:
 a plenum back wall affixed to an interior surface of an inlet cowl of a nacelle of the aircraft to define a plenum between the interior surface and a front surface of the plenum back wall, the nacelle surrounding a rotor assembly of an aircraft propulsion system, the inlet cowl defining a plurality of perforations through a thickness of the inlet cowl, the perforations fluidly connected to the plenum; and
 a fluid delivery network coupled to the plenum back wall and configured to supply an anti-ice liquid into the plenum for the anti-ice liquid to penetrate through the perforations onto an exterior surface of the inlet cowl along a leading edge section of the inlet cowl.

Clause 2. The fluid ice protection system of Clause 1, wherein the inlet cowl includes a lipskin that defines the leading edge section, the lipskin including a composite panel and a metallic coating disposed along an exterior surface of the composite panel to protect the composite panel from damage, the perforations penetrating through the composite panel and the metallic coating.

Clause 3. The fluid ice protection system of Clause 2, wherein the composite panel includes a carbon fiber reinforced polymer (CFRP) material.

Clause 4. The fluid ice protection system of any of Clauses 1-3, further comprising a membrane secured to the interior surface of the inlet cowl within the plenum and covering the perforations, the membrane configured to distribute the anti-ice liquid among the perforations.

Clause 5. The fluid ice protection system of Clause 4, wherein the membrane includes a porous plastic material.

Clause 6. The fluid ice protection system of any of Clauses 1-5, further comprising a pump operably connected to the fluid delivery network and a reservoir that contains the anti-ice liquid, the pump configured to supply the anti-ice liquid from the reservoir along the fluid delivery network to the plenum.

Clause 7. The fluid ice protection system of Clause 6, further comprising one or more sensors and a controller that includes one or more processors, the one or more sensors configured to generate sensor data indicative of a pressure within the fluid ice protection system, the controller configured to change an operating setting of the pump in response to the sensor data indicating that the pressure within the fluid ice protection system is outside of a designated pressure range or exceeds a designated threshold pressure value.

Clause 8. The fluid ice protection system of Clause 6 or Clause 7, further comprising an electrical energy storage device disposed onboard the aircraft, the electrical energy storage device configured to supply electric current to power operation of the pump.

Clause 9. The fluid ice protection system of any of Clauses 1-8, further comprising a heater device, one or more sensors, and a controller that includes one or more processors, the one or more sensors configured to generate sensor data indicative of a temperature of the anti-ice liquid within the fluid ice protection system, the controller operably connected to the heater device and configured to activate the heater device to warm the anti-ice liquid in response to the sensor data indicating that the temperature of the anti-ice liquid is below a designated threshold temperature value.

Clause 10. The fluid ice protection system of any of Clauses 1-9, wherein the fluid delivery network includes a feeder conduit coupled to an inlet of a proportioning device and multiple branch conduits coupled to an outlet of the proportioning device, the proportioning device configured to distribute the anti-ice liquid received from the feeder conduit to the multiple branch conduits, the branch conduits coupled to the plenum back wall along different respective sections of the inlet cowl.

Clause 11. The fluid ice protection system of any of Clauses 1-10, wherein the rotor assembly of the aircraft propulsion system within the nacelle is driven by a motor that is electrically powered by an electrical energy storage device disposed onboard the aircraft.

Clause 12. The fluid ice protection system of any of Clauses 1-11, wherein the perforations have respective diameters that are less than 100 microns.

Clause 13. The fluid ice protection system of any of Clauses 1-12, wherein the fluid ice protection system draws less than 100 watts of power during operation.

Clause 14. The fluid ice protection system of any of Clauses 1-13, wherein the plenum back wall affixed to the interior surface of the inlet cowl of the nacelle is a first plenum back wall, and the fluid ice protection system further comprises a second plenum back wall affixed to an interior surface of a leading edge section of a wing of the aircraft, the fluid delivery network including first set of one or more conduits that convey the anti-ice liquid to the first plenum back wall, and a second set of one or more conduits that convey the anti-ice liquid to the second plenum back wall.

Clause 15. The fluid ice protection system of any of Clauses 1-14, wherein the inlet cowl includes first and second protrusions that project from the interior surface, and the plenum back wall includes first and second flanges that are each bonded to a ramp surface of a respective one of the first and second protrusions to affix the plenum back wall to the interior surface of the inlet cowl, the plenum located between the first and second protrusions.

Clause 16. A method for assembling a fluid ice protection system onboard an aircraft, the method comprising:
 affixing a plenum back wall to an interior surface of an inlet cowl of a nacelle of the aircraft to define a plenum between the interior surface and a front surface of the plenum back wall, the nacelle surrounding a rotor assembly of an aircraft propulsion system, the plenum back wall aligns with a plurality of perforations defined through a thickness of the inlet cowl such that the plenum is fluidly connected to the perforations; and
coupling a fluid delivery network to the plenum back wall, the fluid delivery network configured to supply an anti-ice liquid into the plenum for the anti-ice liquid in the plenum to penetrate through the perforations onto an exterior surface of the inlet cowl along a leading edge section of the inlet cowl.

Clause 17. The method of Clause 16, further comprising coupling a reservoir and a pump to the one or more conduits of the fluid delivery network, the pump configured to supply the anti-ice liquid from the reservoir along the fluid delivery network to the plenum.

Clause 18. The method of Clause 16 or Clause 17, further comprising securing a membrane to the interior surface of the inlet cowl such that the membrane is within the plenum and covers the perforations, the membrane configured to distribute the anti-ice liquid among the perforations.

Clause 19. The method of any of Clauses 16-18, further comprising forming the perforations in the inlet cowl by laser drilling the perforations through a carbon fiber reinforced polymer (CFRP) panel and a metallic coating of a lipskin of the inlet cowl, the metallic coating disposed along an exterior surface of the CFRP panel to protect the CFRP panel from damage, the metallic coating defining the exterior surface of the inlet cowl.

Clause 20. The method of any of Clauses 16-19, wherein the plenum back wall is affixed to the interior surface of the inlet cowl by bonding first and second flanges of the plenum back wall to respective ramp surfaces of first and second protrusions that project from the interior surface, the plenum defined between the first and second protrusions.

Clause 21. An aircraft comprising:
an electrical energy storage device;
one or more propulsion systems each comprising a motor, a rotor assembly, and a nacelle that surrounds the motor and the rotor assembly, wherein the motor is electrically connected to the electrical energy storage device and powered by the electrical energy storage device to drive the rotor assembly to generate thrust for flight of the aircraft; and
a fluid ice protection system incorporated into the nacelle of the one or more propulsion systems, the fluid ice protection system comprising:
a plenum back wall affixed to an interior surface of an inlet cowl of the nacelle to define a plenum between the interior surface and a front surface of the plenum back wall, the inlet cowl defining a plurality of perforations through a thickness of the inlet cowl, the perforations fluidly connected to the plenum; and
a fluid delivery network coupled to the plenum back wall and configured to supply an anti-ice liquid into the plenum for the anti-ice liquid in the plenum to penetrate through the perforations onto an exterior surface of the inlet cowl along a leading edge section of the inlet cowl.

Clause 22. The aircraft of Clause 21, wherein the aircraft lacks a combustion engine.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Diagrams of embodiments herein may illustrate one or more control or processing units, such as the controller 520 shown in FIG. 12. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the controller 520 may represent processing circuitry such as one or more of a field programmable gate array (FPGA), application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. The controller 520 shown in FIG. 12 is configured to execute a set of instructions that are stored in one or more storage elements (such as one or more memories), in order to process data. For example, the controller 520 may include or be coupled to one or more memories. The storage elements may also store data or other information as desired or needed. The storage elements may be in the form of an information source or a physical memory element within a processing machine.

The set of instructions may include various commands that instruct the controller 520 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A fluid ice protection system for an aircraft, the fluid ice protection system comprising:
    a plenum back wall affixed to an interior surface of an inlet cowl of a nacelle of the aircraft to define a plenum between the interior surface and a front surface of the plenum back wall, the nacelle surrounding a rotor assembly of an aircraft propulsion system, the inlet cowl defining a plurality of perforations through a thickness of the inlet cowl, the perforations fluidly connected to the plenum, wherein the inlet cowl includes first and second protrusions that project from the interior surface and have respective ramp surfaces, wherein the plenum back wall includes a first flange that is bonded, via a first lap joint, to the ramp surface of the first protrusion and a second flange that is bonded, via a second lap joint, to the ramp surface of the second protrusion to affix the plenum back wall to the inlet cowl, wherein the plenum is defined between the first and second protrusions;
    a fluid delivery network coupled to the plenum back wall and configured to supply an anti-ice liquid into the plenum for the anti-ice liquid to penetrate through the perforations onto an exterior surface of the inlet cowl along a leading edge section of the inlet cowl;
    a heater device;
    one or more temperature sensors configured to generate sensor data indicative of a temperature of the anti-ice liquid within the fluid ice protection system; and
    a controller that includes one or more processors, the controller operably connected to the heater device and configured to activate the heater device from an inactive state to warm the anti-ice liquid in response to the sensor data indicating that the temperature of the anti-ice liquid is below a designated threshold temperature value.

2. The fluid ice protection system of claim 1, wherein the inlet cowl includes a lipskin that defines the leading edge section, the lipskin including a composite panel and a metallic coating disposed along an exterior surface of the composite panel to protect the composite panel from damage, the perforations penetrating through the composite panel and the metallic coating.

3. The fluid ice protection system of claim 2, wherein the composite panel includes a carbon fiber reinforced polymer (CFRP) material.

4. The fluid ice protection system of claim 1, further comprising a membrane secured to the interior surface of the inlet cowl within the plenum and covering the perforations, the membrane configured to distribute the anti-ice liquid among the perforations.

5. The fluid ice protection system of claim 4, wherein the membrane includes a porous plastic material.

6. The fluid ice protection system of claim 1, further comprising a pump operably connected to the fluid delivery network and a reservoir that contains the anti-ice liquid, the pump configured to supply the anti-ice liquid from the reservoir along the fluid delivery network to the plenum.

7. The fluid ice protection system of claim 6, further comprising one or more pressure sensors configured to generate second sensor data indicative of a pressure within the fluid ice protection system, the controller configured to change an operating setting of the pump in response to the second sensor data indicating that the pressure within the fluid ice protection system is outside of a designated pressure range or exceeds a designated threshold pressure value.

8. The fluid ice protection system of claim 6, further comprising an electrical energy storage device disposed onboard the aircraft, the electrical energy storage device configured to supply electric current to power operation of the pump.

9. The fluid ice protection system of claim 1, wherein the fluid delivery network includes a feeder conduit coupled to an inlet of a proportioning device and multiple branch conduits coupled to an outlet of the proportioning device, the proportioning device configured to distribute the anti-ice liquid received from the feeder conduit to the branch conduits, the branch conduits coupled to the plenum back wall along different respective sections of the inlet cowl.

10. The fluid ice protection system of claim 1, wherein the rotor assembly of the aircraft propulsion system within the nacelle is driven by a motor that is electrically powered by an electrical energy storage device disposed onboard the aircraft.

11. The fluid ice protection system of claim 1, wherein the perforations have respective diameters that are less than 100 microns.

12. The fluid ice protection system of claim 1, wherein the plenum back wall affixed to the interior surface of the inlet cowl of the nacelle is a first plenum back wall, and the fluid ice protection system further comprises a second plenum back wall affixed to an interior surface of a leading edge section of a wing of the aircraft, the fluid delivery network including first set of one or more conduits that convey the anti-ice liquid to the first plenum back wall and a second set of one or more conduits that convey the anti-ice liquid to the second plenum back wall.

13. A method for assembling a fluid ice protection system onboard an aircraft, the method comprising:
  affixing a plenum back wall to an interior surface of an inlet cowl of a nacelle of the aircraft to define a plenum between the interior surface and a front surface of the plenum back wall, the nacelle surrounding a rotor assembly of an aircraft propulsion system, the plenum back wall aligns with a plurality of perforations defined through a thickness of the inlet cowl such that the plenum is fluidly connected to the perforations, wherein the inlet cowl includes first and second protrusions that project from the interior surface and have respective ramp surfaces, wherein affixing the plenum back wall to the inlet cowl comprises bonding, via a first lap joint, a first flange of the plenum back wall to the ramp surface of the first protrusion and bonding, via a second lap joint, a second flange of the plenum back wall to the ramp surface of the second protrusion, wherein the plenum is defined between the first and second protrusions;
  coupling a fluid delivery network to the plenum back wall, the fluid delivery network configured to supply an anti-ice liquid into the plenum for the anti-ice liquid in the plenum to penetrate through the perforations onto an exterior surface of the inlet cowl along a leading edge section of the inlet cowl;
  receiving, at a controller that includes one or more processors, sensor data generated by one or more temperature sensors that indicates a temperature of the anti-ice liquid within the fluid delivery network;
  determining, via the controller and based on the sensor data, that the temperature of the anti-ice liquid within the fluid delivery network is below a designated threshold temperature value; and
  activating a heater device from an inactive state to warm the anti-ice liquid in response to determining that the temperature of the anti-ice liquid is below the designated threshold temperature value.

14. The method of claim 13, further comprising coupling a reservoir and a pump to the one or more conduits of the fluid delivery network, the pump configured to supply the anti-ice liquid from the reservoir along the fluid delivery network to the plenum.

15. The method of claim 13, further comprising securing a membrane to the interior surface of the inlet cowl such that the membrane is within the plenum and covers the perforations, the membrane configured to distribute the anti-ice liquid among the perforations.

16. The method of claim 13, further comprising forming the perforations in the inlet cowl by laser drilling the perforations through a carbon fiber reinforced polymer (CFRP) panel and a metallic coating of a lipskin of the inlet cowl, the metallic coating disposed along an exterior surface of the CFRP panel to protect the CFRP panel from damage, the metallic coating defining the exterior surface of the inlet cowl.

17. An aircraft comprising:
  an electrical energy storage device;
  one or more propulsion systems each comprising a motor, a rotor assembly, and a nacelle that surrounds the motor and the rotor assembly, wherein the motor is electrically connected to the electrical energy storage device and powered by the electrical energy storage device to drive the rotor assembly to generate thrust for flight of the aircraft; and
  a fluid ice protection system incorporated into the nacelle of the one or more propulsion systems, the fluid ice protection system comprising:
    a plenum back wall affixed to an interior surface of an inlet cowl of the nacelle to define a plenum between the interior surface and a front surface of the plenum back wall, the inlet cowl defining a plurality of perforations through a thickness of the inlet cowl, the perforations fluidly connected to the plenum, wherein the inlet cowl includes first and second protrusions that project from the interior surface and have respective ramp surfaces, wherein the plenum back wall includes a first flange that is bonded, via a first lap joint, to the ramp surface of the first protrusion and a second flange that is bonded, via a second lap joint, to the ramp surface of the second protrusion to affix the plenum back wall to the inlet cowl, wherein the plenum is defined between the first and second protrusions;
    a fluid delivery network coupled to the plenum back wall and configured to supply an anti-ice liquid into the plenum for the anti-ice liquid in the plenum to penetrate through the perforations onto an exterior surface of the inlet cowl along a leading edge section of the inlet cowl;
    a heater device;
    one or more temperature sensors configured to generate sensor data indicative of a temperature of the anti-ice liquid within the fluid ice protection system; and
    a controller that includes one or more processors, the controller operably connected to the heater device and configured to activate the heater device from an inactive state to warm the anti-ice liquid in response to the sensor data indicating that the temperature of the anti-ice liquid is below a designated threshold temperature value.

18. The fluid ice protection system of claim 1, wherein the controller is configured to control the heater device to warm the anti-ice liquid without causing the anti-ice liquid to exhibit a phase change from liquid to gas.

* * * * *